United States Patent [19]

Ahr et al.

[11] Patent Number: 4,459,069
[45] Date of Patent: Jul. 10, 1984

[54] PNEUMATIC DISPATCH STATION WITH A CONNECTING TUBE WHICH CAN BE SHIFTED INTO A TRANSIT POSITION, INTO A RECEIVING POSITION, AND INTO A SENDING POSITION

[75] Inventors: Dieter Ahr; Hans-Joachim Kardinal, both of Berlin, Fed. Rep. of Germany

[73] Assignee: Siemens Aktiengesellschaft, Berlin & Munich, Fed. Rep. of Germany

[21] Appl. No.: 365,455

[22] Filed: Apr. 5, 1982

[30] Foreign Application Priority Data

Apr. 6, 1981 [DE] Fed. Rep. of Germany ....... 3114418

[51] Int. Cl.³ .............................................. B65G 51/32
[52] U.S. Cl. ..................................... 406/74; 406/110; 406/182
[58] Field of Search .................. 406/74, 63, 110, 111, 406/112, 182

[56] References Cited

FOREIGN PATENT DOCUMENTS

| 1908766 | 9/1975 | Fed. Rep. of Germany . |
| 2905994 | 8/1979 | Fed. Rep. of Germany . |
| 1412733 | 8/1965 | France .................................. 406/110 |
| 2291129 | 11/1974 | France .................................. 406/110 |

Primary Examiner—Jeffrey V. Nase
Assistant Examiner—Daniel R. Edelbrock
Attorney, Agent, or Firm—Hill, Van Santen, Steadman & Simpson

[57] ABSTRACT

In an exemplary embodiment, a slide selectively closes the upper end of the connecting tube. The dispatch tube and the receiving opening are offset relative to one another in such manner that, at the moment a pneumatic traveler is transferred out of the receiving opening, a mechanical restraining device of the dispatch tube is not yet actuated. The pneumatic dispatch station can be employed as a dispatch station with a dispatch ready position for an outgoing pneumatic traveler, as a receiving station and as a transit station with the use of only a single connecting tube movable to three positions therein. The three positions may be separated by less than two diameters of the tube.

7 Claims, 3 Drawing Figures

U.S. Patent
Jul. 10, 1984
4,459,069
FIG.1
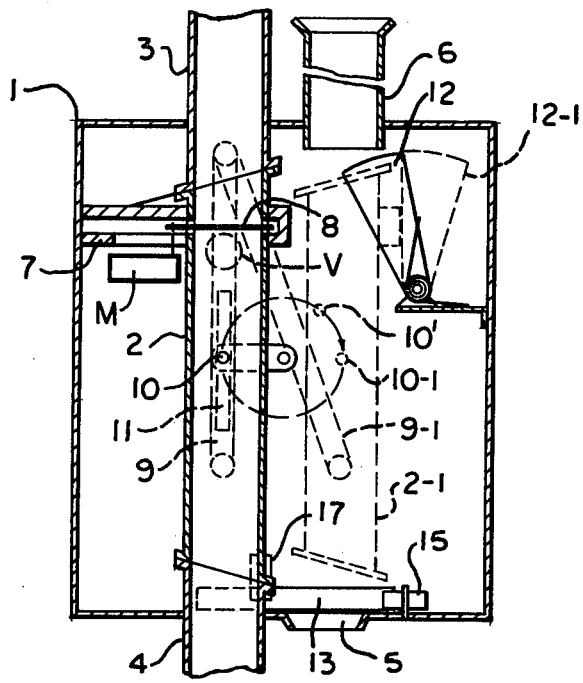
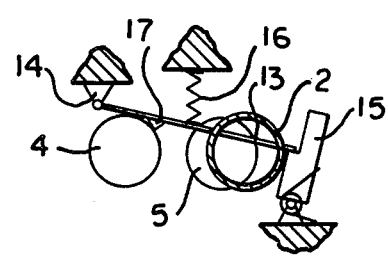
FIG. 2
FIG. 3

PNEUMATIC DISPATCH STATION WITH A CONNECTING TUBE WHICH CAN BE SHIFTED INTO A TRANSIT POSITION, INTO A RECEIVING POSITION, AND INTO A SENDING POSITION

BACKGROUND OF THE INVENTION

The invention relates to a pneumatic dispatch station with a connecting tube mounted within a station housing for alignment with a forwarding tube entering the station housing from above and one entering from below, said connecting tube being selectively coverable or releasable at one end by means of a slide seated in a slide housing, the slide location being bypassed or bridged by means of a valve-controlled air conduit, and said connecting tube being movable to a position with its upper end in alignment with a transmission tube inserted into the upper limiting surface of the station housing and equipped with a restraining device for pneumatic travelers which are to be dispatched and being movable to a position with its lower end in the area of a receiving opening in the lower limiting surface of the station housing.

In a known pneumatic dispatch station of this type— German OS No. 29 05 994 (FIG. 1 and claims 1 and 5)—, the connecting tube is displaceable perpendicular to its longitudinal axis. Both the forwarding tube entering the station housing from the top as well as from the bottom exhibit openings which lead into an air channel via which the two forwarding tube sections are connected to one another. A clack valve working in one direction is situated in this air channel. A slide housing is disposed in the lower edge area of the connecting tube, a slide being perpendicularly displaceable relative to the longitudinal axis of the traveling tube path within said slide housing in such manner that the lower end of the connecting tube can be optionally covered (blocked) or released. For the reception of an incoming pneumatic traveler, the slide is inserted into the connecting tube; therewith, the incoming pneumatic traveler slides down against the slide pneumatically decelerated. After the shutdown of the pneumatic conveyor, the connecting tube is displaced so that its longitudinal axis remains parallel to its original orientation until it is in alignent with the outward transfer opening. Thereupon, the slide is retracted so that the pneumatic traveler can fall through the outward transfer opening into a collecting container. Subsequently, the connecting tube is returned into the transit position.

The aligning position of the traveling tube with the outward transfer opening simultaneously corresponds to the aligning position of the connecting tube with the dispatch tube. A pneumatic traveler intended for dispatch cannot yet be introduced into the dispatch tube given an aligned position of the connecting tube with said dispatch tube since the lower end area of the dispatch tube is blocked by means of a switchable restraining device. The acceptance of a pneumatic traveler ensures only after the outward transfer of the received pneumatic traveler and a subsequent, renewed closing of the lower edge area of the connecting tube by the slide.

The invention proceeds from a variation of the known pneumatic dispatch station insofar as the slide is disposed not in the lower area of the connecting tube but, rather, at the upper end of the connecting tube. Pneumatic travelers intended for reception, therefore, must always enter the pneumatic dispatch station from below and come to rest with their upper end face in the area of the slide, this position of rest being made possible by means of maintaining the device via the valve-controlled shunt air conduit. Pneumatic travelers which first enter the pneumatic dispatch station from the top are transferred out by means of keeping the connecting tube free over the location of the pneumatic dispatch station; after leaving the station area, the direction of the driving air is reversed and the pneumatic traveler is conveyed back to the pneumatic dispatch station from below. This variation of the known pneumatic dispatch station is connected therewith so that particularly heavy pneumatic travelers and pneumatic travelers transported with a high air speed enter the pneumatic dispatch station more slowly from below in the described reception and, thus, more favorable operating conditions exist both in view of the mechanical loads of the station as well as in view of noise propagation.

A pneumatic dispatch station with a slide in the upper area of the pneumatic dispatch station which can likewise be employed as a dispatch, receiving or transit station is already known from the German LP No. 19 08 766 (FIG. 9 as well as specification col. 10, line 65 through col. 11, line 32). The essential connecting element of this pneumatic dispatch station is a shunt tube which is rotatably mounted at its upper area and can be placed in alignment with the second forwarding tube or with an outward transfer opening at its lower end. The slide is situated directly above the pivot bearing of the shunt tube. For receiving a pneumatic traveler, the shunt tube remains in alignment with the two forwarding tube sections connecting with the station housing; the slide is inserted into the upper forwarding tube path. A pneumatic traveler arriving from below is thus pneumatically decelerated and arrives at the slide with a very low final velocity. Pneumatic travelers which are to be sent out can be inserted into the open end of the lower forwarding tube after the shunt tube has been pivoted into its outward transfer position; likewise, a pneumatic traveler to be dispatched can be directly introduced into the shunt tube when said shunt tube is in its pivoted-out state, whereby there is no longer any possibility here of keeping a further pneumatic traveler which is to be dispatched in readiness within the pneumatic dispatch station during the outward transfer of a pneumatic traveler or of already dispatching said further pneumatic traveler. The possibility of introducing a pneumatic traveler into the station from below through the outward transfer opening also exists; a holding device secured to the shunt tube thereby accepts the pneumatic traveler and, given an appropriate pivoting of the shunt tube, conveys it via the lower forwarding tube opening. Thus, in addition to the transit position and the outward transfer position, the shunt tube must be able to assume a third basic position in which pneumatic travelers which are to be dispatched are introduced into the forwarding tube path. Beyond that, it is structurally difficult to secure the pneuamtic traveler in the holding device and to prevent it from dropping immediately out of the introduction opening on the one hand and, on the other hand, to render possible an unimpeded dropping-out of the pneumatic traveler given an aligned position of the holding device with the lower forwarding tube. These conditions can be met in practice only with additional control-engineering outlay and/or loss of simplicity of operability of the pneumatic dispatch station. CL

SUMMARY OF THE INVENTION

The object of the invention is to provide a pneumatic dispatch station with the slide disposed in the upper end area of the connecting tube in such manner that the inward transfer of pneumatic travelers to be dispatched and the outward transfer of received pneumatic travelers is made possible without additional drive-technical outlay and with simple structural means. This is achieved in that the connecting tube, in the course of its movement out of alignment with the forwarding tube sections, is first placed in alignment with the receiving opening, and, subsequently, in alignment with the dispatch tube as it deflects the restraining device out of its effective position; as well as in that a traveler blocking device is allocated to the receiving opening, said traveler blocking device being released by the connecting tube during its movement from its position aligned with the receiving opening to that aligned with the dispatch tube, being released in the sense of covering the receiving opening by means of a traveler guidance element, and being reset into its initial position where it is displaced from the receiving opening during motion of the connecting tube from its position aligned with the receiving opening to that aligned with the forwarding tube sections.

Insofar as a pneumatic traveler which has come to rest at the location of the slide is to be tranferred out and a pneumatic traveler to be sent off is simultanteously situated in the dispatch tube, it is achieved by means of the offset of the dispatch tube and of the receiving opening that the outward transfer operation of the pneumatic traveler ensures without being influenced by the pneumatic traveler resting in the dispatch tube. In particular, one can therewith forego electromagnetic, switchable restraining devices for the dispatch tube. Therewith, a priority for the transposition (changeover sequence) of the pneumatic dispatch station is simultaneously given in the simplest manner, since, as the connecting tube is moved back into its transit position, the pneumatic traveler resting in the dispatch tube necessarily remains therein. In contrast thereto, the transfer of a pneumatic traveler to be dispatched necessarily ensues when the connecting tube enters into alignment with the dispatch tube.

In this context, an advantageous further development of the invention provides that the restraining device is designed as a latch which can be deflected by means of the connecting tube against the force of a reset spring. In the course of the return of the connecting tube out of its position aligned with the dispatch tube into the transit position, the latch is moved back into its initial position by the reset spring and can again accept (restrain) pneumatic travelers which are to be sent out.

Insofar as the connecting tube is shifted beyond the position aligned with the receiving opening—particularly into the position aligned with the dispatch tube—, the traveler guidance element is triggered. Pneumatic travelers transferred from the dispatch tube into the connecting tube thus rest with their bottom surface against the traveler guidance element and, sliding along this, are entrained by the connecting tube until its aligned position with the forwarding tube sections has been reached. Of course, the edge area of the lower forwarding tube must be designed in such manner or, respectively, must connect to the traveler guidance element in such manner that an entrainment of the pneumatic traveler by the traveler guidance element into the forwarding tube path is made possible.

The traveler blocking device can be structurally realized in various manners. A particularly advantageous design of the traveler blocking device provides that the traveler guidance element is disposed below the connecting tube and, on the one hand, is pivotably mounted on that side of the receiving opening adjacent the lower forwarding tube and, on the other hand, is supported on a support disposed at the other side of the receiving opening which support is shifted into a release position releasing the traveler guidance element at least upon arrival of the connecting tube into alignment with the dispatch tube; when released the traveler guidance element pivots into a position convering the receiving opening under the influence of a spring. Thus, the traveler guidance element can be designed as a rod or plate which is secured to the station housing by means of a simple pivot bearing and is biased toward its traveler guidance position by means of a spring. The position of rest of the traveler guidance element is prescribed by the position of rest of the support; when the support is displaced by the approaching connecting tube, the traveler guidance element is released from its initial position and pivots into a position which covers the receiving opening. The pivot angle is expediently limited in that a partial area of the surface of the support forms a detent or stop for engaging the traveler guidance element which has pivoted in.

A further advantageous development of the invention relates to the resetting of the traveler guidance element into its initial position when a pneumatic traveler to be introduced into the forwarding tube path has at least passed the area of the receiving opening to such degree that, after removal of the traveler guidance element from the area of the receiving opening, a faultless entrainment of the pneumatic traveler by the connecting tube is possible. It is provided in this conjunction that the traveler guidance element carries a dog or cam element projecting into the path of motion of the connecting tube, at least in the pivoted-in traveler guidance position of said traveler guidance element. The simplest realization of the entrainment of the traveler guidance element by the connecting tube, for example, can ensue by means of the direct influence of the tube wall of the connecting tube on the cam element. It is thereby conceivable that the position of rest of the traveler guidance element is determined in such manner that, given maximum excursion of the traveler guidance element due to the traveling tube, the position of rest is just achieved. It is likewise possible that, in the course of the passage of the connecting tube past the traveler guidance element, said element experiences an excursion which goes beyond the position of rest (e.g. by a distance comparable to the thickness dimension of the element) and that a return of the traveler guidance element into its position of rest only ensures in the course of further displacement of the connecting tube in the direction toward its position aligned with the forwarding tube sections. The position of rest is then fixed by the renewed bearing of the traveler guidance element against the support which support pivots back into its initial position under the influence of a spring, in the course of the movement of the connecting tube out of its alignment with the dispatch tube and toward its transit position.

The path of movement of the connecting tube can be both straightline as well as arced. In addition to the movement proceeding perpendicularly to the longitudinal axis of the connecting tube—provided in the pneumatic dispatch station initially described—, it can also be provided that the connecting tube is pivotable around an axis placed at its central range. Expediently, the air conduit bridging the slide is likewise placed at this central range with a connection.

According to an advantageous further development of the invention, the connecting tube is driven by means of a rocker arm (or crank drive) whose dead center positions (with minimum change of position of the connecting tube per angular drive increment) correspond to the aligned position of the connecting tube with the forwarding tube trains and with the dispatch tube, respectively. As is known, given employment of crank drives, very precise final positions of the driven parts can be achieved, so that the aligning position of the connecting tube with the forwarding tube path on the one hand and with the dispatch opening on the other hand can be precisely observed. The aligning position of the traveling tube with the receiving opening then corresponds to an intemediate position of the rocker arm between the two dead center positions.

In the following, the invention is described on the basis of an exemplary embodiment illustrated in three Figures on the accompanying drawing sheet; and other objects, features and advantages will be apparent from this detailed disclosure and from the appended claims.

BRIEF DESCRIPTION OF THE DRAWINGS

FIG. 1 shows a schematic illustration of a pneumatic dispatch station in vertical section.

A traveler blocking device is shown in FIGS. 2 and 3 in two different positions of the connecting tube.

DETAILED DESCRIPTION

Within a station housing 1, the pneumatic dispatch station illustrated in FIG. 1 exhibits a connecting tube 2 which is in alignment with two forwarding tube sections 3, 4 in the illustrated position. The connecting tube 2 can be shifted into two further positions (by movement perpendicularly to its longitudinal axis) in which it aligns with a receiving opening 5 or, respectively, a dispatch tube 6. In its upper area, the connecting tube 2 carries a slide housing 7 in which a slide 8 can be shifted into two different positions. In the illustrated position of the slide 8, the connecting tube 2 is closed off, whereby an air stream is maintained over an air conduit 9 with a valve V, both illustrated with broken lines. The air stream influences the lower traveling ring of an incoming pneumatic traveler (not illustrated) and leads to the abutment of said traveler against the slide 8.

In the subsequent outward transfer of a received pneumatic traveler a crank drive schematically indicated by a pin 10 and a coupling means 11 for the connecting tube as well as a path of movement indicated with broken lines 10' and 10-1 is activated. During the displacement of the connecting tube 2 to position 10-1, the flexibly designed air conduit 9 is corresponding displaced to position 9-1.

Upon arrival of the connecting tube 2 in its position aligned with the receiving opening 5, the pneumatic traveler resting in the connecting tube 2 falls out of the station housing 1 under the influence of the force of gravity and into a collecting container (not illustrated).

Insofar as a pneumatic traveler prepared for dispatch is seated in the dispatch tube 6, the connecting tube 2 is moved beyond its position aligning with the receiving opening 5 until it has reached the position 2-1 aligned with the dispatch tube 6. In the final phase of this movement, the resiliently biased and pivotably mounted latch 12 against which the pneumatic traveler seated in the dispatch tube 6 rests, pivots to a position 12-1 and, thus, the pneumatic traveler is transferred into the connecting tube 2. Therewith, the pneumatic traveler drops down to rest on the traveler guidance element 13, FIGS. 1 and 3, disposed below the connecting tube 2.

The design and function of the traveler blocking device can particularly be derived from FIGS. 2 and 3. The traveler blocking device is essentially formed by the traveler guidance element 13 which is mounted in a pivot bearing 14 and is supported on a support 15; a compression spring 16 presses the traveler guidance element 13 against the support 15. The traveler guidance element 13 is situated beneath the connecting tube 2 and carries a dog or cam element 17 which projects into the path of motion of the connecting tube 2.

As can be particularly derived from FIG. 3 or, respectively, a comparison of FIG. 3 with FIG. 2, the connecting tube 2 pivots the support 15 in the final phase of its displacement motion to the dispatch tube 6, so that the traveler guidance element 13 is pressed by spring 16 down onto an edge of the support 15 which is placed lower. Therewith, the traveler guidance element 13 resides in the area of the clear cross-section of the receiving opening 5, so that a pneumatic traveler seated in the connecting tube 2 is carried along on the traveler guidance element 13 when the connecting tube 2 is returned from its position 2-1 aligned with the dispatch tube 6 into its intial position. In the final phase of the return motion of the connection tube 2, the cylinder wall of the connecting tube 2 presses the dog 17 aside, so that the traveler element 13 is pivoted out to its position covering the receiving opening 5 and into a position such as indicated at 13-a. In the course of the introduction of the connecting tube 2 into its position aligning with the forwarding tube sections 3, 4, the dog 17 disengages from the connecting tube 2 and the traveler guidance element 13 is again placed against the support 15 as shown in FIG. 2.

It will be apparent that many modifications and variations may be made without departing from the scope of the teachings and concepts of the present invention.

We claim as our invention:

1. A pneumatic dispatch station comprising a station housing having a dispatch tube at an upper side thereof and a receiving opening at a lower side thereof, a connecting tube mounted within the station housing, a forwarding tube section entering the station housing from the top and a forwarding tube section entering the station housing from the bottom, said connecting tube being selectively coverable or releasable at one end by means of a slide, a slide housing mounting the slide, a valve-controlled air conduit bridging the slide, and said connecting tube being movable to a position with its upper end in alignment with the dispatch tube, a restraining device for pneumatic travelers which are to be dispatched, said connecting tube being movable to a position with its lower end aligned with the receiving opening, characterized in that the slide (8) is disposed in the upper end area of the connecting tube (2) and in that the dispatch tube (6) and the receiving opening (5) are offset relative to one another in such manner that, in the course of being moved out of alignment with the forwarding tube sections, the connecting tube (2) is first placed in alignment with the receiving opening (5) and, subsequently, into the alignment with the dispatch tube (6), thereby deflecting the restraining device (12) out of its effective position; as well as in that the receiving opening (5) has a traveler blocking device allocated to it comprising a traveler guidance element (13) triggered by the connecting tube (2) during its movement between the position aligned with the receiving opening (5) and that aligned with the dispatch tube (6), said traveler guidance element being triggered in the sense of being movable into covering relation to the receiving opening (5), said traveler guidance element being reset during the motion of the connecting tube between the position aligned with the receiving opening (5) and that aligned with the forwarding tube sections (3, 4) and upon being reset into its initial position releasing the receiving opening (5).

2. A pneumatic dispatch station according to claim 1, characterized in that the restraining device has a reset spring and comprises a latch (12) which experiences excursion due to the connecting tube (2) against the force of the reset spring.

3. A pneumatic dispatch station according to claim 1, characterized in that the traveler guidance element (13) is disposed beneath the path of the connecting tube (2) and, on the one hand, is pivotably mounted on that side of the receiving opening (5) adjacent the lower forwarding tube section (4), said traveler blocking device further comprising a support (15) disposed at the other side of the receiving opening (5), and a spring (16) acting on the traveler guidance element (13), said support, at least upon arrival of the connecting tube (2) into its position aligned with the dispatch tube (6), being deflected in such manner that, under the influence of the spring (16), the traveler guidance element is pivoted into the position covering the receiving opening (5).

4. A pneumatic dispatch station according to claim 3, characterized in that the support (15) forms a detent for supporting the pivoted-in traveler guidance element (13) in its position covering the receiving opening, the support forming said detent with a sub-area of its surface.

5. A pneumatic dispatch station according to claim 3, characterized in that the traveler guidance element (13) carries a dog (17) which projects into the path of motion of the connecting tube (2) at least in the pivoted-in position of the traveler guidance element where it covers the receiving opening.

6. A pneumatic dispatch station according to claim 1, characterized in that the connecting tube is pivotable around an axis which is placed in its central region.

7. A pneumatic dispatch station according to claim 1, characterized in that a crank device is coupled with the connecting tube for shifting the same, the crank drive having dead center positions corresponding to the positions of the connecting tube (2) in alignment with the forwarding tube sections (3, 4) and in alignment with the dispatch tube (6).

* * * * *